United States Patent [19]

Plück et al.

[11] 4,370,285
[45] Jan. 25, 1983

[54] METHOD OF PRODUCTION OF A LIGHTWEIGHT BUILDING ELEMENT

[75] Inventors: Christian Plück; Peter Schuster, both of Frechen, Fed. Rep. of Germany

[73] Assignee: Schneider GmbH & Co., Frechen, Fed. Rep. of Germany

[21] Appl. No.: 195,296

[22] Filed: Oct. 7, 1980

[30] Foreign Application Priority Data

Dec. 10, 1979 [DE] Fed. Rep. of Germany ....... 2941370

[51] Int. Cl.³ .............................................. B29H 7/20
[52] U.S. Cl. .................................... 264/43; 264/45.2; 264/65; 501/80
[58] Field of Search .................. 264/43, 45.2, 65, 102, 264/109, 113, 332; 425/352, 398, 400, 412, DIG. 817; 106/40; 501/80

[56] References Cited

U.S. PATENT DOCUMENTS

| | | |
|---|---|---|
| 2,241,441 | 5/1941 | Bandur ................................. 264/120 |
| 3,619,861 | 11/1971 | Lumby ....................... 425/DIG. 817 |
| 3,717,693 | 2/1973 | Kohl et al. ........................... 425/412 |
| 3,745,201 | 7/1973 | Sundermanor et al. ............... 264/43 |
| 4,057,383 | 11/1977 | Bettonica ............................ 425/412 |
| 4,207,114 | 6/1980 | Schuster et al. ...................... 264/43 |

FOREIGN PATENT DOCUMENTS

| | | |
|---|---|---|
| 1181611 | 11/1964 | Fed. Rep. of Germany . |
| 1914372 | 4/1971 | Fed. Rep. of Germany . |
| 2604793 | 8/1977 | Fed. Rep. of Germany . |
| 2724010 | 11/1978 | Fed. Rep. of Germany . |

Primary Examiner—Donald E. Czaja
Assistant Examiner—W. Thompson
Attorney, Agent, or Firm—Michael J. Striker

[57] ABSTRACT

A method of producing lightweight building blocks, in which an expandable or foamable ceramic material is charged into a mold, compacted and then fired with subsequent cooling.

13 Claims, 3 Drawing Figures

METHOD OF PRODUCTION OF A LIGHTWEIGHT BUILDING ELEMENT

BACKGROUND OF THE INVENTION

The invention relates to a process and arrangement for the production of a building element consisting of foamed ceramics or expanded clay aggregate.

Building elements consisting of foamed ceramics or expanded clay aggregate are included in lightweight building materials. A lightweight building element of expanded clay aggregate is produced by filling non-expanded or expanded granulate into a mold, and heating until the surfaces of the expanded granulate are sintered. The lightweight building element from expanded clay aggregate will thus display the structure of expanded granulate. In contrast hereto, an element from foamed ceramics made from unexpanded or expanded shot-shaped material or a mixture thereof, is produced by supplying heat, whereby foaming of the shot ensues in such a manner that a mass interspersed with pores will result after the burning process, this mass, when cooled down, having the appearance of a spongelike or foamlike product.

In the production of such lightweight building elements, attention must be paid to the fact that the heaped aggregate as filled into molds will—like all green ceramic stock—show strong initial shrinkage but will strongly grow upon expansion or foaming. The shrinkage will, however, not correspond to growing upon expansion, so that molded bodies of dimensional trueness can be made—if at all—only at considerable expenditure.

One possible method of producing molded bodies to exact dimensions is by initially expanding shot-shaped material, filling it into a mold when still hot and conglutinate, and compressing the conglutinate mass to the dimensions desired. (DE publication of specification No. 1 181 611).

Another process as per DE publication of specification No. 1 914 372 provides in the production of a lightweight building element for expanded or expandable granulate of approximate uniform size to be filled into a mold box and for the loosely heaped aggregate then to be heated until the surface of all granules has reached a bondable state and until commencement of the expansion process. In the subsequent expansion process, the heaped aggregate must be strongly held down so that the granulate can expand into all cavities and become a solid body of ceramically bonded expanded granules. The arrangement for implementing the known process is provided with a portable mold box having massive side walls, a bottom with sieve-like perforations and a massive cover. The cover is to prevent the heaped aggregate from occupying during the expansion process a space larger than made available by the interior space of the mold box.

The art of controlling such processes for the production of molded bodies that are true to shape and dimensions is extremely difficult and requires very complicated arrangements. Furthermore, care must be taken that the expanded body may be stripped from the mold without difficulties, i,e. that it will not adhere or bake onto the mold walls during production. This may be achieved with separating agents which, however, will not ensure the desired separating effect in every instance.

Since it is nearly impossible to manage the aforenoted difficulties in the production of lightweight building elements that are to be true to dimensions and shape, one will usually choose the method of producing lightweight building elements from expanded clay aggregate or foamed ceramics aggregate by using a steel or ceramic mold open at the top, providing the walls with a separating agent, subsequently filling the mold with heaped aggregate, heating the heaped aggregate and allowing unrestricted growing during the expansion or foaming process, cooling the molded body after expansion, stripping it from the mold and subsequently cutting or sawing from the molded body a lightweight construction element of the desired dimensions.

SUMMARY OF THE INVENTION

It is the object of the invention to provide a process and arrangement by which lightweight building elements of foamed ceramics or expanded clay aggregate, true to shape and dimensions, may be produced in a simple manner from heaped aggregate.

As per invention, this object is attained by a process for the production of lightweight building elements from foamed ceramics or expanded clay aggregate, wherein aggregate from expandanble or foamable material is filled into a mold, the heaped material fired so that it will expand in the desired manner with subsequent cooling of the molded body together with the mold, the process being characterized by compacting the heaped aggregate prior to firing. Compaction is preferably implemented by a pressing process.

According to a particular embodiment of the invention, the heaped aggregate is pressed into a molded body of inhomogeneous compaction, wherein the peripheral zones of the molded body will be of higher compaction than the core zone. The free spaces thus resulting below the plane of the highest elevation of the exposed surface of the precompacted molded body are then filled with an additional heaping of aggregate. It is, of course, within the framework of the invention, that inhomogeneous compacting and additional filling of free spaces may me made repeatedly. It is essential that compaction and additional filling will cause a sufficient quantity of material to be in the peripheral zone of the stock in the mold so that shrinkage of the stock during heating can be compensated, and that foaming or expanding will ensue in such a manner that the molded body will be of a level surface and of prescribed dimensions. It came unexpectedly and could not be simply foreseen that peripheral compaction and additional filling would readily result in the cavities resulting from shrinkage during heating to become filled without affecting thereby the desired dimensional trueness of the element. The effect of these measures as per invention cannot be exactly explained. It may be possible that compacting will retard expansion in the compacted peripheral zones of the stock in the mold, so that the additionally filled-in heaped aggregate will, when expanding, initially fill the cavities caused by shrinking and that the compacted material, conjointly with the other material, will then homogeneously expand and/or foam in the mold up to the predetermined height, whereby a level surface and, particularly in foaming, a body with very homogeneous structure will result. For producing prism-shaped bodies, the exposed surface of the heaped aggregate is preferably compacted into a cupola shape, whereby, when seen in cross-section toward the periphery, somewhat funnel-shaped recesses will result, said recesses then being filled with heaped aggregate in such a manner that an exposed level surface will result anew. It, of course, also possible herein, and, in given instances also appropriate, to heap the stock aggregate higher than the height of the cupola.

Compaction pressure and additionally-filled quantity depend upon the type of raw material to be heaped, the shape of the raw material (shot, granulate or floury), upon shrinkage and degree of expansion as well as upon the rate of heating and many other factors, so that compaction pressure and additionally-filled quantity must be determined empirically.

Elements from foamed ceramics, as described in DE publication of specification No. 26 04 793 and in DE letter of disclosure No. 27 24 010, can be produced with particular advantage by the process as per invention. Therein, clay-mineral bearing, non-expandable raw materials, preferably usual stoneware clay, mixed with a foaming agent from a sulfate and a sulfide, and, in given instances also with an admixture of the usual fluxing agents, are mixed with water, the mixture granulated, the granulate dryed if so required, and then heaped into a mold.

The heaped aggregate is then compacted according to the process as per invention, and the resultant free spaces are replenished with heaped aggregate. The stock is subsequently heated to foaming and cooled, wherein a mixture of iron sulfate and iron sulfide is preferably selected as foaming agent and/or ash from sewage sludge is added to the mixture.

Granulate in a size range from 0.3 to 3.0 mm is particularly suitable for the process as per invention, with a moisture of 8 to 10 percent by weight of water. These granulates are particularly suitable for dry compaction.

Since a molded body of homogeneous structure can be produced by the process as per invention, the process is particularly suitable also for the production of the foamed ceramics elements with micro-fissures, as described in the aforenamed DE letter of disclosure No. 27 24 010.

As per a further embodiment of the invention, the stock in the mold, replenished with additionally-filled material, is recompacted. It is particularly advantageous herein, if initial compaction into cupola shape is made under a pressure amounting to approximately 1/10 of the pressure of recompaction. The heaped aggregate is, for instance, precompacted to a cupola of 1500 mm radius, the spaces laid free by compaction being subsequently replenished with identical heaped material, whereupon recompaction is made at approximately 250 bar. A blank treated in this manner will, after foaming or expanding, result in a lightweight building element from foamed ceramics or expanded clay aggregate, that is true to dimensions and shape.

Another embodiment of the invention provides for precompacting and recompacting the blank, wherein, during recompacting said blank is subjected to compressing it into a dry-pressed firing mold of ceramic material and concomitant anchoring it to the walls and bottom of the mold. This process will result in a blank having a very intimate contact with the firing mold of ceramic material. This composite may then readily be handled and, for instance, be subjected to ceramic firing without the need for further firing additives. A ceramic, dry-pressed mold of identical, or approximately identical shrinkage as the compacted blank, is selected as firing mold, so that no shrinkage cavities between blank and firing mold will result upon heating. The firing mold will thus appropriately consist of a material of identical, or approximately identical shrinkage as the heaped aggregate. Ajusting to identical or approximately identical shrinkage is preferably attained by using, as a matter of principle, for preparation of the firing mold, material that is identical in constitution to the material of the heaped aggregate. It is merely the expanding or foaming agents that should be present in lesser quantities in the material for the firing mold, or be completely absent therein. The mold material is preferably used as granulate, particularly of a size range from 0.3 to 3.0 mm; it may, however, also be used in floury form. The mold material will preferably be of a moisture before pressing of 8 to 10% by weight, so that it may readily be pressed dry.

According to a particular embodiment of this process, the firing mold is formed simultaneously in one operating step during recompaction of the blank, and the compressed into the firing mold. This preferred variant of the process is appropriately implemented with a compression apparatus, wherein the heaped aggregate for the blank is filled into a receiver, the blank subsequently compacted and the receiver then enlarged, so that a mold for the firing mold is formed, surrounding the precompacted blank as hollow space. This hollow space for the firing mold is thereupon filled with the mold material and recompaction of the blank, or, respectively, compaction of the body of the firing mold, is then performed, whereby the blank is pressed into the firing mold and anchored therein. Subsequently, the firing mold with the compacted blank is removed from the compression apparatus and the composite is fired and cooled, wherein the blank will expand and form a lightweight building element of predetermined dimensions. The dry-pressed firing mold of ceramic material, in conjunction with the also dry-pressed blank compacted to a relatively high density, will thus provide for predetermining the dimensions and for the development of a homogeneous structure of the lightweight building element. In precompacting the heaped aggregate, a compacting pressure is selected that will be adequate for producing a stable blank which, in turn, will allow being surrounded or, respectively, jacketed with the material for the firing mold without collapsing. The compaction pressure for precompaction of foamable granulate with a size range of 0.3 to 3.0 mm as used for a foamed ceramics element according to DE publication of specification No. 26 04 793 and DE letter of disclosure No. 27 24 010, will be approximately 25 bar if a pressure of approximately 250 bar is selected for recompacting. The body consisting of firing mold and blank should after recompacting, be of a compaction that will ensure dimensional trueness and a homogeneous structure of the lightweight building element.

The process as per invention, with dry-pressed firing mold, is particularly suitable for the production of a lightweight building element having a protective layer. In such an instance, the bottom of the firing mold will serve as protective layer, after the side walls of the mold have been removed from the lightweight building element upon cooling, for example by being sawed off. Such a sandwich-type lightweight building element is particularly being used as floor slab, since the protective layer can be produced in such a manner that it will be especially resistant to impact, shock and abrasion. For this purpose, aggregate is preponderantly being used for the firing mold, that is of the same mineralogical composition as the product to be foamed, however, with the foaming agents having been strongly reduced therein. For instance, a granulate is used for the firing mold, having a size range from 0.3 to 3.0 mm and consisting of an aggregate of approximately 25% by weight alumina, approximately 25% by weight sewage-sludge ash and approximately 50% by weight clay, with the clay preferably being a quartzite-rich stoneware clay. A firing mold from this material, which is compacted at approximately 250 bar, and within which the blank, also compacted at approximately 250 bar, has been anchored, is very stable, stackable and will provide homogeneous expansion, particularly foaming, of the blank, without the shrinkage of the ceramic materials being able to exert an uncontrollable influence upon the dimensions of the foamed or expanded lighweight building element.

A process for the production of a building component consisting of foamed ceramics, is known from DE letter of disclosure No. 25 11 869 and DE letter of disclosure No. 25 12 597, said building element being coated on at least one side with normal ceramics or a ceramic material of lesser porosity. A lower, trough-shaped, covering layer is, herein, provided inter alia with ribs of a foamable ceramic mass and the trough covered with a covering layer of a ceramic mass. When moving the blank through the furnace, the ceramic mass of the ribs is to foam into the free spaces remaining between the ribs, so that these spaces will be formed full with foamy ceramic mass when the product leaves the furnace. The cover is joined to the trough and should thus prevent foaming over, so that the external shape of the trough and cover will represent the dimensions of the final product. The known process is thus operating with ceramic masses i.e. with pliable, extruded masses. Dimensional stability of the lightweight building element, as desired per invention, can thus not be attained in all instances when pliable masses are being used.

Using the drawing, the invention is explained in detail with the aid of an embodiment.

DETAILED DESCRIPTION OF THE PREFERRED EMBODIMENTS

Figure 1:
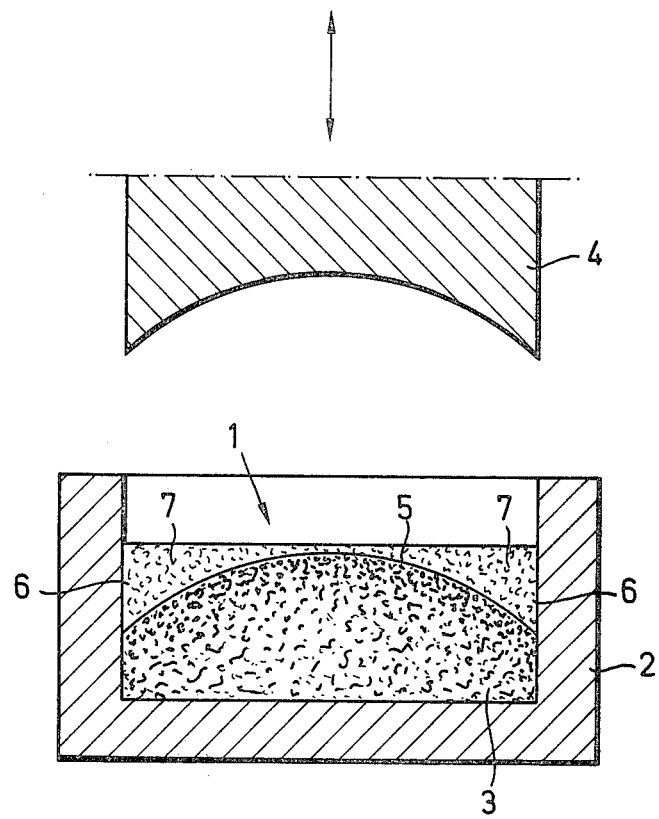
FIG. 1 is a schematic view of a blank with cupola-shaped precompaction zone and additional filling material in a firing mold.

The blank 1 per FIG. 1 is received by a mold 2. The blank shows a precompacted zone 3 of cupola shape, with the cupola shape having been molded by the press die 4 acting in the direction of the arrow, said press die having a cross section of arcuate surface shape 5. The free spaces 6 resulting from precompaction have been filled with loosely heaped aggregate 7. A plurality of precompactions and additional fillings may be provided within the framework of the invention, with a flat press die being used in recompaction, so that a level surface of the blank will result.

Figure 2:
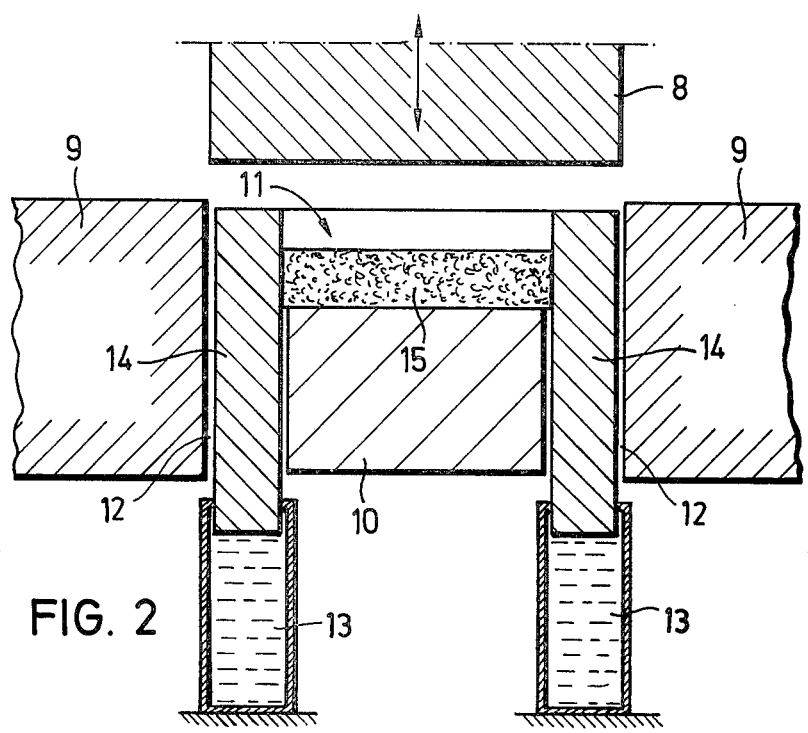
FIG. 2 is the schematic view of an arrangement for the production of the composite body.
Figure 3:
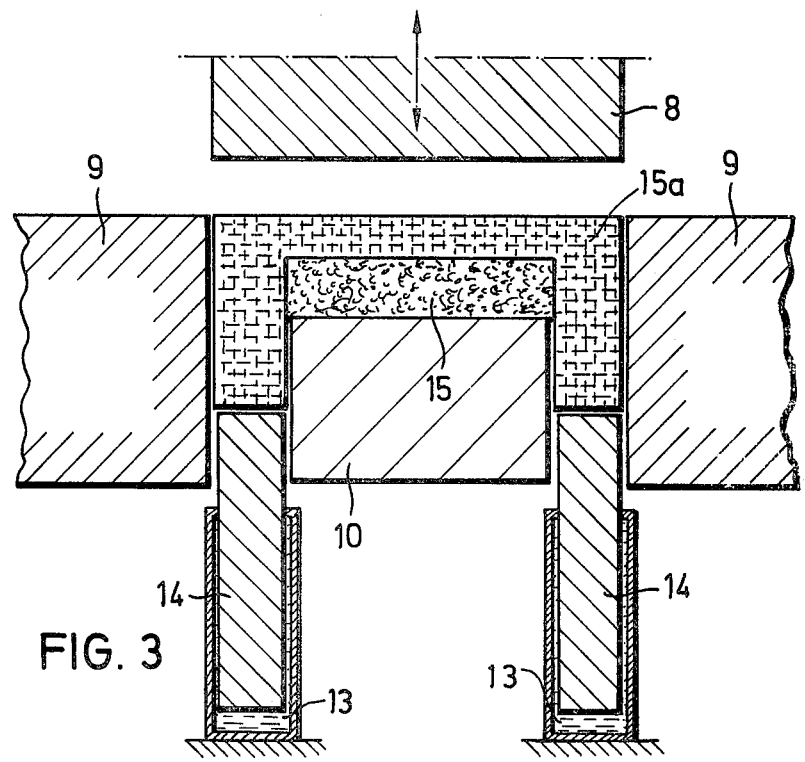
FIG. 3 is the schematic view of the arrangement per FIG. 2, the composite body being located within same.

FIGS. 2 and 3 show a press arrangement consisting of a press die 8 acting in the direction of the arrow, as well as of lateral mold walls 9, of which only two are shown. An abutment 10 is provided in the receiver 11 between the mold walls 9, said abutment being narrower than the interior space of the receiver 11. Intermediate spaces 12 will result therefrom, wherein a steel frame 14 is arranged, preferably floating within a hydraulic medium, or respectively, system 13, the compressing surface of said frame projecting beyond the medium and conjointly with the medium said compressing surface will act in the manner of a press die. A balancing valve in the hydraulic system provides the desired counterpressure. The steel frame 14 may be displaced downward by suitable means (not shown) and arrested in the desired position.

The walls of steel frame 14 form the lateral walls of the mold receiver 11 when producing the precompacted blank 15 (FIG. 1).

As indicated in FIGS. 2 and 3, a firing mold with integrated blank is pressed in the arrangement as per invention.

Herein, heaped aggregate of expandable material is initially filled into the mold space 11, with the frame 14 being located in its uppermost position. The heaped aggregate is then precompacted by means of press die 8, so that the blank 15 will result. When precompacting, the frame 14 is entrained downward against the pressure of medium 13. Subsequently, the press die 8 will return upward with the frame 14 remaining stationary. Frame 14 is then displaced downward and arrested (FIG. 2). The receiving space of U-shaped cross section thus resulting, is then being filled with heaped aggregate for the firing mold, with recompaction following thereupon, by pressing the press die at a predetermined compression force. After returning of the press die, the firing mold 15a with the integrated blank is subsequently removed from the mold space and the composite element is being fired. The upward-moving frame 14 may preferably be used for extracting the composite element from the mold space.

The invention has thus made it possible, to solve by simple means the shrinkage problem in the production of ceramically bonded leighweight construction elements.

We claim:

1. A process of producing a lightweight building element from foamed ceramics or expanded clay aggregate, wherein expandable or foamable material is heaped in bulk into a mold, including the steps of precompacting the heaped material in the mold to obtain a molded body by performing an inhomogeneous compaction with the peripheral zones of the molded body being subjected to compaction higher than that of a core zone thereof, whereby a free space results from the higher compaction; filling said free space with additionally heaped material; finally compressing the material to obtain the precompacted body; and thereafter firing the precompacted body so that the material thereof will expand in a desired manner with subsequent cooling of the mold and the molded body.

2. Process as per claim 1, wherein said precompacting step includes cupola-shaped compaction of the exposed surface of the heaped material when prism-shaped bodies are to be produced, with recesses of funnel-like shape resulting thereby in the cross section toward the perimeter, these recesses being filled with heaped material until a level exposed surface will result thereby.

3. Process as per claim 1 or 2, including using granulates of a size range from 0.3 to 3.0 mm with a moisture content of 8 to 10% by weight of water, and wherein the compaction of the heaped material is ensued by dry pressing.

4. Process as per claim 1 or 3, wherein the stock in the mold results from additional filling with heaped material, being subjected to recompaction.

5. Process as per claim 4, wherein the precompaction is ensued at one-tenth of the pressure for recompaction.

6. Process as per claim 4 or 5, wherein the heaped material is precompacted to cupola shape with a cupola radius of 1500 mm, the free spaces exposed by compaction then being additionally filled with identical heaped material and the recompaction then being made at approximately 250 bar.

7. Process as per claim 4 or 6, including the step of recompacting the stock in the mold, with the stock being compressed into a dry-pressed ceramic firing mold during recompaction.

8. Process as per claim 7, including using for the firing mold a ceramically dry-pressed mold of a shrinkage that is identical or approximately identical to the shrinkage of the compacted blank.

9. Process as per claim 7 or 8, including using a firing mold consisting of the material as heaped, with merely the expanding or foaming agent being absent therein or being present only in limited, preferably ineffectual, quantities.

10. Process as per claim 7 or 9, including the step of using for the firing mold a granulate with a size range from 0.3 to 3.0 mm and having a pressing moisture of 8 to 10% by weight.

11. Process as per claim 7 or 10, including the step of simultaneously shaping the firing mold and compressing the blank into the firing mold in one operating step during the recompaction of the blank.

12. Process as per claim 7 or 11, including the step of merely cutting off the side walls of the firing mold after cooling, so that the bottom of the firing mold will remain as protective layer on the lightweight building element.

13. Process as per claim 7 or 9, including using for the firing mold an aggregate of approximately 25% by weight alumina, 25% by weight sewage-sludge ash and 50% by weight stoneware clay.

* * * * *

UNITED STATES PATENT AND TRADEMARK OFFICE
CERTIFICATE OF CORRECTION

PATENT NO. : 4,370,285
DATED : January 25, 1983
INVENTOR(S) : Christian Plück, Peter Schuster It is certified that error appears in the above—identified patent and that said Letters Patent is hereby corrected as shown below:

On the title page:
In the heading [30], the filing date of the German application should read:

-- October 12, 1979 --

Signed and Sealed this

Sixteenth Day of August 1983

[SEAL]

Attest:

GERALD J. MOSSINGHOFF

Attesting Officer

Commissioner of Patents and Trademarks